March 19, 1968  C. J. MILLER  3,373,482
FLUXLESS ALUMINUM BRAZING
Original Filed Dec. 12, 1963
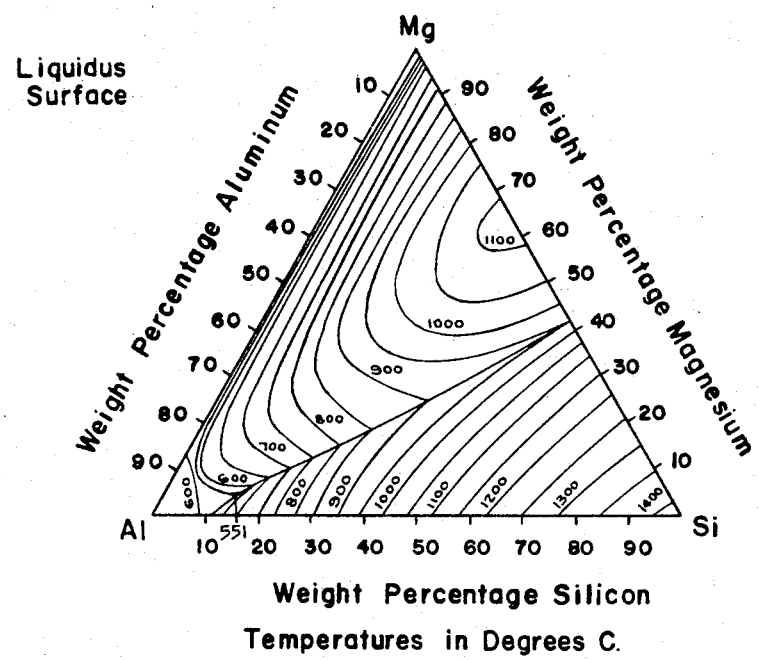
INVENTOR.
CLARENCE JOHN MILLER
BY H.W. Kaufmann
AGENT

3,373,482
FLUXLESS ALUMINUM BRAZING
Clarence John Miller, Paoli, Pa., assignor to General Electric Company, a corporation of New York
Application Dec. 12, 1963, Ser. No. 330,027, now Patent No. 3,322,517, dated May 30, 1967, which is a continuation-in-part of application Ser. No. 163,922, Jan. 2, 1962. Divided and this application Sept. 19, 1966, Ser. No. 616,134
2 Claims. (Cl. 29—501)

This invention pertains to the brazing of metals, and particularly to the brazing of aluminum and its alloys.

This application is a continuation-in-part of application Ser. No. 163,922, filed Jan. 2, 1962, now Patent No. 3,321,828, and a division of Ser. No. 330,027, filed Dec. 12, 1963, now Patent No. 3,322,517, both assigned to the assignee of the present invention.

In brazing operations, a brazing alloy, which can be in powder form or frequently is in the form of sheet, strip, wire and the like, is introduced between members to be joined. The brazing alloy is selected to have a melting temperature lower than any of the members and thus can melt and flow at temperatures below that which would detrimentally affect the material of the members being joined. One of the problems in brazing, however, is that the molten brazing alloy must wet the metal surface of the members to be joined in order to provide a sound joint. Because such materials as stainless steels and aluminum or its alloys form in air a coating of oxide which is difficult to remove, a flux is used to remove the coating of oxides usually present on the faces of the members to be joined. The oxide removal can occur when the flux dissolves such oxides or etches the metal slightly to release the oxide from the surface of the metal, or both. Preferably, some fluxes form at the brazing temperature a fluid air-excluding coating over the joint faces until displaced by the flowing brazing alloy as it wets the faces. Thus the molten brazing alloy comes in contact with an oxide-free surface and a sound joint results. In general, fluxes are corrosive and their residues are difficult or expensive to remove after the brazing operation. This makes them undesirable for some applications such as use in heat exchangers as automobile radiators where cooling fluid can be contaminated with corrosive products or in vacuum chambers where the release under vacuum of corrosive gases from flux residues can be detrimental to articles placed within the chamber or to the chamber itself.

Aluminum and its alloys are particularly susceptible in the presence of air to the formation of a tenacious oxide. For this reason they are frequently brazed in an inert atmosphere or in a vacuum. However, the oxide still must first be removed to obtain a sound joint. Use of conventional mechanical means to remove such oxide film after a vacuum or some other inert, non-oxidizing atmosphere has been produced is a costly and time consuming process even for simple structures. It is wholly impractical for complex structures such as aluminum honeycomb or articles having complex surfaces.

It is a principal object of the present invention to provide an improved method for brazing aluminum or its alloys without the use of a separate flux.

Another object is to provide a brazing alloy which can be used to join aluminum or its alloys without the use of a separate flux.

Still a further object is to provide a brazed article including at a brazed joint an improved brazing alloy.

These and other objects and advantages will be more fully recognized from the following detailed description, examples which are exemplary of, rather than limitations on, the scope of the present invention and drawing which is a simplified version of the ternary phase diagram of liquidus temperatures of the Mg-Si-Al system.

Briefly, the method aspect of the present invention comprises, in a method of providing a juncture between members of any form of aluminum or its alloys, such as wrought, cast, sheet or other forms, the step of producing at the juncture an aluminum alloy including the elements silicon and magnesium and having a melting point of between about 550° C. and the melting point of the lowest to melt of the members. In another form, the method of the present invention includes the addition of other compatible elements such as copper, for example, to adjust the melting temperature of the juncture or improve fillet-forming characteristics.

In a further form, the present invention provides an aluminum base brazing alloy which eliminates the need for a separate flux in the joining of aluminum or its alloys, the brazing alloy having a melting point of about 550–625° C. and, in addition, including in its composition, by weight, about 3–15% Si and 0.4–10% Mg.

It was unexpectedly recognized during vacuum brazing studies of aluminum alloys that the presence of the elements magnesium and silicon at the proposed juncture between members to be brazed resulted in soundly brazed joints without the use of a separate flux. This and additional observations will be described in more detail in connection with Example 1 and the examples of Table I.

It was found that the provision at the juncture of all of the elements aluminum, magnesium and silicon, necessary to the practice of the present invention, can be made by including all of such elements in one or the other of the members to be joined, or some in both. Preferably, however, because commercial aluminum alloys selected to be joined for structural purposes may not together include all of the necessary elements, intermediate materials as, for example, in the form of (1) brazing sheets clad on one or the other of the members to be joined, (2) powder mixtures, (3) sheet inserts, (4) strips or (5) wire or combinations of such forms, can be included where appropriate. The important feature is that the elements silicon and magnesium both be made available along with aluminum at the joint to be brazed in order to produce selectively at the joint, during brazing, the unusual low melting alloy used in the present invention.

A better understanding of what occurs at the brazed joint can be obtained by reference to the drawing which is a ternary phase diagram of the liquidus temperatures, in 0° C., of the Al-Mg-Si system. Such a diagram may be found on page 1246 of the 1948 edition of the Metals Handbook, published by the American Society for Metals, Cleveland, Ohio. Referring to the high aluminum, low silicon lower left corner of the diagram, it is to be noted that an eutectic alloy, melting at about 551° C. exists at about 13 weight percent silicon, about 5 weight percent magnesium and about 82 weight percent aluminum. Further it is to be noted that the liquidus temperatures of other alloy compositions increase rapidly as the composition varies substantially from that point particularly with the increase of silicon content. Because it is desirable to braze commercially available aluminum alloys at temperatures below about 625° C., one feature of the present invention is the formation, selectively at a proposed juncture, of an aluminum base alloy including magnesium and from about 3–15 weight percent silicon in order to control the melting point. In a preferred form, the magnesium content of the alloy formed is less than about 10 weight percent. Reference to ternary phase diagrams of other aluminum alloys shows that the occurrence of this Al-Mg-Si eutectic alloy at about 550° C. is unusual and has heretofore been unrecognized as significantly useful in the art of brazing of aluminum or its alloys.

*Example 1*

In the manufacture of heat exchanging apparatus, it was found desirable to braze aluminum honeycomb to an aluminum sheet member in order to provide a high rate of heat transfer. The honeycomb material was substantially pure aluminum having less than 1% impurities and sometimes referred to commercially as number 1100. The member to which the aluminum honeycomb was brazed in this example was a brazing sheet sometimes referred to commercially as No. 23 braze sheet. The braze sheet consisted of a base sheet member of nominal composition, by weight, 0.35% Si, 0.25% Cu, 0.60% Mg with the balance aluminum. Over the base member was a cladding of a lower melting alloy sheet which contacted the aluminum honeycomb and which consisted of, by weight, 10% Si, up to about 0.3% Cu with the balance aluminum. Thus, the commercially pure aluminum, during the brazing cycle was in contact at the brazing temperature with a molten alloy including 10 weight percent Si and a base alloy including the element Mg.

The pure aluminum honeycomb and the braze sheet with the silicon alloy cladding located between them were placed in a furnace which was then evacuated to about $1 \times 10^{-4}$ mm. Hg. The temperature of the members was then raised to about 590° C., held for about one minute and was then lowered to well below the melting point of the braze alloy. Upon readmission of air to the furnace, the members were found to be soundly brazed together with fillets of metal at the brazed juncture indicative of good wetting of the members by molten metal. Thus it was recognized that aluminum and aluminum alloy parts could be brazed together in a non-oxidizing atmosphere without the use of a separate flux.

*Example 2*

The procedure of Example 1 was repeated using the same commercially pure aluminum honeycomb. In this example the sheet member consisted of a brazing sheet, sometimes commercially referred to as No. 21 braze sheet, having a cladding of about 7.5 weight percent silicon with the balance essentially aluminum and impurities alloy clad to a base sheet of the same 0.35% Si, 0.25% Cu, 0.60% Mg with the balance aluminum base member employed in Example 1. Thus the juncture between the substantially pure aluminum and the base member included the presence of the elements silicon and magnesium along with the aluminum and a small amount of copper.

The operation of Example 1 was repeated with a starting vacuum of about $1.5 \times 10^{-4}$ mm. Hg, a brazing temperature of 590° C. and a final vacuum of about $2 \times 10^{-5}$ mm. Hg. When the members were removed from the furnace, a soundly brazed joint was found.

Because it was recognized that better heat conductivity can be achieved between substantially pure aluminum members than between aluminum and aluminum alloys, and because it was desirable to more fully understand the operation of the present invention, an additional series of examples were prepared and tested in the manner of Examples 1 and 2. The following Table I is representative of the additional examples and, with the exception of Examples 12 and 13, represent the joining of substantially pure aluminum honeycomb to substantially pure aluminum sheet, both of which are sometimes commercially designated as number 1100 alloy. Examples 12 and 13 represent the joining of pure aluminum sheet to pure aluminum sheet.

TABLE I.—JOINING Al HONEYCOMB TO Al SHEET

| Ex. | Intermediate Materials | | Vacuum | | Temp., °C. | Remarks |
|---|---|---|---|---|---|---|
| | Alloy Sheet | Powder | Start | Finish | | |
| 3 | 10% Si, Bal. Al | | $1.5 \times 10^{-4}$ | $2 \times 10^{-5}$ | 600 | Alloy melted, no wetting or filleting, did not braze. |
| 4 | 10% Si, Bal. Al | Mg | $3 \times 10^{-4}$ | $8 \times 10^{-5}$ | 605 | Poor braze. Alloy too fluid. Temp. too high. |
| 5 | 10% Si, Bal. Al | Mg | $2.5 \times 10^{-4}$ | $6.5 \times 10^{-5}$ | 590 | Good braze. |
| 6 | 10% Si, Bal. Al | 50% Mg, 50% Cu | $1 \times 10^{-4}$ | $1 \times 10^{-5}$ | 590 | Do. |
| 7 | | 50% Mg, 50% Cu | $1 \times 10^{-4}$ | $2 \times 10^{-6}$ | 581 | No braze. No evidence of melting. |
| 8 | | 50% Mg, 50% Cu | $1 \times 10^{-4}$ | $6.5 \times 10^{-5}$ | 600 | Do. |
| 9 | 12% Si, Bal. Al | 50% Mg, 50% Cu | $2 \times 10^{-4}$ | $1 \times 10^{-4}$ | 600 | Good braze. Temp. slightly high. |
| 10 | 12% Si, Bal. Al | 50% Mg, 50% Cu | $3 \times 10^{-4}$ | $1.8 \times 10^{-5}$ | 608 | Good braze. Temp. too high. |
| 11 | | 55% Si, 23% Mg, 22% Cu | $3 \times 10^{-4}$ | $1 \times 10^{-4}$ | 600 | Brazed but poor fillet. Temp. too low. |
| 12* | | 55% Si, 23% Mg, 22% Cu | $3 \times 10^{-4}$ | $1.5 \times 10^{-4}$ | 615 | Good braze. |
| 13* | | 50% Mg, 50% Si | $1.5 \times 10^{-4}$ | $2 \times 10^{-4}$ | 590 | Partial Braze. Temp. too low. |
| 14 | 10% Si, Bal. Al | 75% Mg, 25% Cu | $2.5 \times 10^{-3}$ | $2 \times 10^{-4}$ | 588 | Good braze. |

*Al sheet to Al sheet.

In Table I, only the intermediate materials are listed, the structural members being joined being of commercially pure aluminum. It is to be noted that sometimes intermediate brazing alloy sheet is used, sometimes powder is used and sometimes both the alloy sheet and powder are used, it being understood that the introduction of intermediate materials can be in a variety of forms such as powder, alloy sheet, strip, wire and the like.

In Example 3, in which silicon but no magnesium was present in the intermediate alloy sheet, there was no wetting or filleting and no brazed joint resulted, although the intermediate alloy sheet melted. However, when the materials of Example 3 were used in Examples 4 and 5, with the proper adjustment of temperature and the presence of magnesium powder at the joint to be brazed, a soundly brazed juncture was achieved. In Example 6, Example 5 was repeated with the modification that a mixture of copper and magnesium powder was used to improve fillet characteristics. This, too, resulted in a good braze. However, in Examples 7 and 8, using the same powder intermediate material but with the absence of the 10% silicon alloy, no braze was evidenced even though the brazing temperature was increased. Examples 9 and 10 at substantially the same or a little higher temperature than that of Example 8 but with the introduction of a 12% silicon alloy sheet as an intermediate material with the copper-magnesium powder resulted in a soundly brazed juncture. Examples 11, 12 and 13 show that the introduction of a powder as an intermediate material between two pure aluminum members to be joined, whether the members are in a complex form such as honeycomb or in sheet form, can result in a good brazed joint in the absence of a separate flux with the proper adjustment in temperature. Example 14 shows the use of an intermediate alloy sheet with an intermediate powder including such other compatible elements as copper to adjust the melting temperature and filleting characteristics. It is expected than the melting point of the quaternary eutectic of the system Al-Mg-Si-Cu would be lower than the ternary eutectic of the system Al-Mg-Si. Indeed, from Example 14, it is seen that the satisfactory brazing temperature is lower than many of the others not including a melting point adjustment.

The above examples emphasize a feature of the present invention of selectively lowering the melting point of the members to be joined at the proposed juncture by the diffusion of magnesium and silicon either from one member to another or between members through the use of intermediate materials. Thus it will be recognized that the present invention contemplates the use of the aluminum or the aluminum alloy members alone. If magnesium and silicon are included at proper levels in such alloys or the introduction of intermediate materials as appropriate between the members to be joined, with the physical form of the intermediate material being relatively unimportant so long as it is available at the proposed juncture.

The powder applied in the above examples was suspended in a volatile vehicle such as methyl, Cellosolve, adequate to suspend the powder long enough to permit its being applied. The suspension was poured or brushed on the aluminum base sheet material or the alloy sheet material in the above examples and was allowed to dry. There remained a thin layer of powder uniformly coating the workpiece. The magnesium powder employed was purified magnesium, the copper powder was chemically pure copper powder as was the powdered silicon all of which were approximately 325 mesh. However, it was found necessary to deoxidize the copper powder prior to use because it was found that the copper powder in the "as-received" condition would not alloy in adjusting the melting temperature and fillet condition. Therefore the copper powder was deoxidized by heating in a hydrogen atmosphere at about 800° C. after which it was applied in powder form as shown in the above Table I.

Examples 12 and 13 were conducted with an L-shaped upper structural member of heavier (about ⅛") material resting upon a flat lower member. The temperatures were determined by a Chromel-Alumel thermocouple whose junction was in contact with one of the workpiece members. In the above Table I, as throughout this specification, all of the percentages are percent by weight.

There are several theories which could explain the mechanism through which the tenacious oxides of aluminum are either penetrated, ruptured, or relocated in the practice of the present invention. Analysis of furnace ceramics surrounding the members which were brazed in the examples showed the presence of magnesium which was deposited, of necessity, from vapor. Therefore it might be thought that the magnesium vapor acts to reduce the aluminum oxide because magnesium is somewhat more reactive than aluminum. However, as was mentioned above, "as-received" copper powder would not perform in the method of the present invention and was found at the conclusion of the brazing operation unabsorbed and still loose on the surface of the workpiece when it was removed from the furnace. Deoxidized copper powder did alloy with the joint material. Because copper oxide is easier to reduce than aluminum oxide and since magnesium is a great deal more reactive than copper, it is believed that the magnesium does not reduce the aluminum oxide, if under the same conditions, it does not reduce copper oxide.

A more logical explanation for the mechanism involved with the present invention is that magnesium vapor penetrates the aluminum oxide coating, either through oxide layer cracks or porosity in the layer, to wet the metal beneath at the joint face. The resulting surface tension is sufficient to free the oxide coating from the metal on which it was originally formed, and possibly rupture the coating to allow intimate contact between the molten brazing alloy and the two components to be joined. Such porosity or cracks in the tenacious aluminum oxide coating are so small that the surface tension of molten metal would not allow it to penetrate but the metallic vapors can so penetrate. This type of mechanism is described by A. J. Wall and D. R. Milner in an article entitled "Wetting and Spreading Phenomena in a Vacuum" in the June 1962 issue of the Journal of the Institute of Metals at page 394. The article describes the mechanical removal of an oxide film by the creeping of wetting metal which has penetrated the film.

As was mentioned above, improvement in filleting and adjustment in melting point can be made by the introduction of deoxidized copper. It is contemplated that the addition of other compatible metallic elements to adjust characteristics of the brazed joint can be made to result in a family of alloys having the low melting characteristics in the area of the above described ternary eutectic of Al-Mg-Si.

Thus it has been recognized that in the method of the brazing aluminum or its alloys, the step of diffusing magnesium and silicon into the members at the proposed joint to selectively lower melting point at the joint has provided an improvement in the art of brazing aluminum structural members. Further, the introduction of a particular brazing alloy between substantially pure aluminum members to be joined provides an unusual and useful tool in the metal joining art.

Although the present invention has been described in connection with specific examples, it will be understood by those skilled in the art the modifications and variations of which the invention is capable.

What is claimed is:

1. A fluxless brazing method of making a fabricated structure comprising:
   (a) Providing members of aluminum alloy;
   (b) Assembling the said members in their desired relationship;
   (c) Providing at the junctions of the said members an alloy comprising at least 2 and not more than 13% of silicon;
   (d) Providing in the vicinity of the junctions of the said members magnesium in the metallic state;
   (e) Evacuating the space around the said members;
   (f) Raising the temperature of the said parts to at least 590° C., but less than the melting point of the said members;
   (g) Cooling the said parts to room temperature.

2. A fluxless brazing method of making a fabricated structure comprising:
   (a) Providing a plurality of at least partly metallic aluminum base parts of which each metallic aluminum base portion comprises some but not all of the constituents of a eutectic alloy comprising aluminum, magnesium and silicon, and has a melting point equal to or lower than the melting point of pure aluminum;
   (b) Assembling the said parts in their desired relationship;
   (c) Providing, at each juncture between any said metallic portions of said assembled parts, all constituents of the said eutectic alloy not present in the metallic portions forming the said juncture;
   (d) Heating the said juncture in a non-oxidizing atmosphere to a temperature greater than the melting point of the said eutectic alloy and less than the melting point of any said portion, and maintaining them at a temperature in the range thus defined for a period of time sufficient for formation at each juncture of a molten alloy comprising the constituents of the said eutectic and for joining of said metallic aluminum base portions;

(e) Cooling the said assembly below the solidification temperature of the said molten alloy.

References Cited

UNITED STATES PATENTS

| | | | |
|---|---|---|---|
| 2,907,105 | 10/1959 | Ohmi | 29—504 X |
| 2,916,815 | 12/1959 | Donkervoort | 29—504 |
| 2,943,181 | 6/1960 | Gunow | 29—494 X |
| 2,969,590 | 1/1961 | Milliken | 29—494 X |
| 2,987,816 | 6/1961 | Noland | 29—501 X |
| 3,063,145 | 11/1962 | Bouton | 29—503 X |
| 3,081,534 | 3/1963 | Bredzs | 29—494 |
| 3,083,452 | 4/1963 | Terrill | 29—498 X |
| 3,133,348 | 5/1964 | Cape | 29—494 |
| 3,180,022 | 4/1965 | Briggs | 29—504 X |
| 3,235,959 | 2/1966 | Bartoszak | 29—504 X |

JOHN F. CAMPBELL, *Primary Examiner.*

R. F. DROPKIN, *Assistant Examiner.*